US 011337386B2

(12) United States Patent
Hurtaud

(10) Patent No.: US 11,337,386 B2
(45) Date of Patent: May 24, 2022

(54) INDOOR AQUAPONICS ASSEMBLY

(71) Applicant: François Hurtaud, Central (HK)

(72) Inventor: François Hurtaud, Central (HK)

(*) Notice: Subject to any disclaimer, the term of this patent is extended or adjusted under 35 U.S.C. 154(b) by 51 days.

(21) Appl. No.: 16/908,762

(22) Filed: Jun. 23, 2020

(65) Prior Publication Data

US 2021/0392831 A1 Dec. 23, 2021

(51) Int. Cl.
| A01K 63/00 | (2017.01) |
| A01G 31/02 | (2006.01) |
| C02F 3/32 | (2006.01) |
| A01K 63/04 | (2006.01) |
| A01K 63/06 | (2006.01) |
| A01G 7/04 | (2006.01) |
| A01G 31/00 | (2018.01) |
| C02F 103/20 | (2006.01) |

(52) U.S. Cl.
CPC ............ *A01G 31/02* (2013.01); *A01G 7/045* (2013.01); *A01K 63/003* (2013.01); *A01K 63/045* (2013.01); *A01K 63/047* (2013.01); *A01K 63/06* (2013.01); *C02F 3/327* (2013.01); *A01G 2031/006* (2013.01); *C02F 2103/20* (2013.01)

(58) Field of Classification Search
CPC ........ A01G 31/02; A01G 31/06; A01G 31/00; A01G 7/045; A01G 2031/006; A01K 63/00; A01K 63/003; A01K 63/047; A01K 63/06
See application file for complete search history.

(56) References Cited

U.S. PATENT DOCUMENTS

| 3,713,583 | A | * | 1/1973 | Gruber | E03B 9/20 239/17 |
| 5,067,060 | A | * | 11/1991 | Sieracki | A01K 63/06 362/101 |
| 5,127,366 | A | * | 7/1992 | Kim | A01K 63/003 119/246 |
| 6,607,144 | B1 | * | 8/2003 | Yen | B05B 17/08 239/16 |
| 9,108,212 | B2 | * | 8/2015 | Yeiser, IV | A01G 9/02 |
| 9,374,952 | B1 | * | 6/2016 | Cross | A01G 31/047 |
| 2013/0047508 | A1 | * | 2/2013 | Toone | A01G 31/02 47/62 R |
| 2014/0223818 | A1 | * | 8/2014 | Coghlan | A01K 63/045 47/62 R |
| 2014/0223819 | A1 | * | 8/2014 | Coghlan | A01K 63/003 47/62 R |
| 2015/0181821 | A1 | * | 7/2015 | Park | A01G 31/02 47/62 R |
| 2015/0264899 | A1 | * | 9/2015 | Kasner | A01K 63/06 119/246 |

(Continued)

*Primary Examiner* — Son T Nguyen

(57) ABSTRACT

The present invention relates to an indoor aquaponics assembly which includes a base, an aquarium positioned above and supported by the base, a planter positioned above the aquarium, an aquarium conduit and a planter conduit. The planter is provided with at least two through holes facing towards the aquarium, one being adapted for a water drainage tube to pass through for draining water from the planter to the aquarium, and one being adapted for a tube of a pump to pass through for pumping water from the aquarium to the planter. The present invention aims at reducing the time and efforts required for caring and maintaining the aquarium and the plants.

16 Claims, 7 Drawing Sheets

(56) References Cited

U.S. PATENT DOCUMENTS

| | | | |
|---|---|---|---|
| 2015/0296726 A1* | 10/2015 | Higgins | A01G 31/06 47/62 R |
| 2016/0135394 A1* | 5/2016 | Wagner | A01G 9/022 47/62 R |
| 2019/0110417 A1* | 4/2019 | Zeng | A01G 7/045 |
| 2020/0037526 A1* | 2/2020 | Sperry | A01G 7/045 |
| 2021/0007308 A1* | 1/2021 | He | A01G 31/06 |
| 2021/0100179 A1* | 4/2021 | Woolsey | A01G 31/06 |

* cited by examiner

INDOOR AQUAPONICS ASSEMBLY

BACKGROUND OF THE INVENTION

The present invention relates to an aquarium apparatus and more particularly pertains to an indoor aquaponics assembly.

It is common for people to keep fish at home as a hobby. Some hotels, shopping malls and commercial establishments also keep fish for aesthetic purposes. In general, it is necessary to devote time and efforts to care and maintain the aquarium, such as feeding the fish, changing water, cleaning the aquarium and so forth. It is also common for people to keep plants for aesthetic purposes; but again, it is necessary to devote time and efforts to take care of the plants.

BRIEF SUMMARY OF THE INVENTION

In view of the aforesaid disadvantages now present in the prior art, the present invention provides an indoor aquaponics assembly which aims at reducing the time and efforts required for caring and maintaining the aquarium and the plants.

To attain this, the present invention comprises a base, an aquarium, a planter, an aquarium conduit and a planter conduit. The base has a hollow interior. The aquarium is an open top container, wherein the aquarium is positioned above and supported by the base. The planter is positioned above the aquarium. The aquarium conduit extends upwards from a bottom surface of the aquarium, wherein the aquarium conduit has an open top end and an open bottom end which communicates with the hollow interior of the base. The planter conduit extends upwards from a bottom surface of the planter, wherein the planter conduit has an open bottom end which engages and communicates with the open top end of the aquarium conduit so that the planter conduit and the aquarium conduit form an integrated conduit with an integrated interior space which communicates with the hollow interior of the base. The planter is further provided with at least two through holes facing towards the aquarium, one being adapted for a water drainage tube to pass through for draining water from the planter to the aquarium, and one being adapted for a tube of a pump to pass through for pumping water from the aquarium to the planter. The planter conduit is further provided with an opening on a peripheral wall thereof.

The present invention further comprises a support positioned between the aquarium and the planter for connecting the planter to the aquarium. The support comprises an annular supporting plate and a connecting conduit passing through the annular supporting plate. The annular supporting plate is fixed in position in relation to the connecting conduit. The planter sits on top of the annular supporting plate. A first portion of the connecting conduit below the annular supporting plate is inserted into the aquarium conduit; a second portion of the connecting conduit above the annular supporting plate is inserted into the planter conduit. The open bottom end of the planter conduit engages and communicates with the open top end of the aquarium conduit via the connecting conduit so that the planter conduit, the connecting conduit and the aquarium conduit form the integrated conduit with the integrated interior space which communicates with the hollow interior of the base. The annular supporting plate is provided with a first support through hole corresponding to the first through hole adapted for the pump outlet tube of the pump to pass through for pumping water from the aquarium to the planter, and a second support through hole corresponding to the second through hole adapted for the water drainage tube to pass through for draining water from the planter to the aquarium.

The aquarium conduit extends upwards from a middle portion of the bottom surface of the aquarium.

The planter conduit extends upwards from a middle portion of the bottom surface of the planter, and the planter conduit has an open top end that opens to an exterior.

The at least two through holes are provided at the bottom surface of the planter.

A light source is fixedly accommodated within the integrated interior space to provide lighting for both the planter and the aquarium all around 360 degrees. The light source is in form of three light tubes fixedly mounted on a support stand. Each of the light tubes extends from top to bottom of the integrated conduit. The support stand is in shape of a triangular cylinder with three sides and three edges. The three light tubes are fixedly mounted on the three sides respectively. Each of the three edges has an upper bolt and a lower bolt, each of which extends from the edge through a corresponding bolt opening on the planter conduit and having a bolt head larger in size than the corresponding bolt opening and abutting against the corresponding bolt opening.

The planter conduit and the aquarium conduit are each provided with a plurality of grooves on an inner surface thereof for diffusing light from the light source. The connecting conduit is provided with a plurality of grooves on an outer surface of a peripheral wall thereof for diffusing light from the light source.

The planter comprises an upper shield and a lower base engaged with each other. The upper shield has an upper planter conduit extended downwards from a top of the upper shield. The lower base has a lower planter conduit extended upwards from a middle portion of a bottom surface of the lower base. The upper planter conduit and the lower planter conduit are engaged with each other to form the planter conduit. The opening provided on the peripheral wall of the planter conduit is formed by a first notch provided on a bottom edge of a peripheral wall of the upper planter conduit, a second notch provided on an upper edge of a peripheral wall of the lower planter conduit, and a third notch provided on an upper edge of a peripheral wall of the connecting conduit, all of which are corresponding in position in relation to each other.

The upper shield of the planter is provided with a plurality of upper shield openings on a peripheral wall thereof.

The light source is either controlled manually or by a wireless control module operable by a mobile application of an external mobile device.

A power supply socket which is electrically connected to an external power source is provided in the base.

The aquarium conduit is provided with an aquarium conduit opening on an upper edge of a peripheral wall thereof, and the connecting conduit is provided with a second opening corresponding to the aquarium conduit opening; an elongated slot is provided on the peripheral wall of the connecting conduit to connect the third notch and the second opening, and a slot is provided on the annular supporting plate corresponding to the elongated slot.

The present invention is advantageous in that it offers a 360-degree aquarium which is aesthetically pleasing. It utilizes the same light source to provide lighting for both the planter and the aquarium, resulting in a simple structure which reduces the number of parts needed and simplifies the assembly process, and give access to the plant and the fish all around the product.

DETAILED DESCRIPTION OF THE INVENTION

Figure 1:
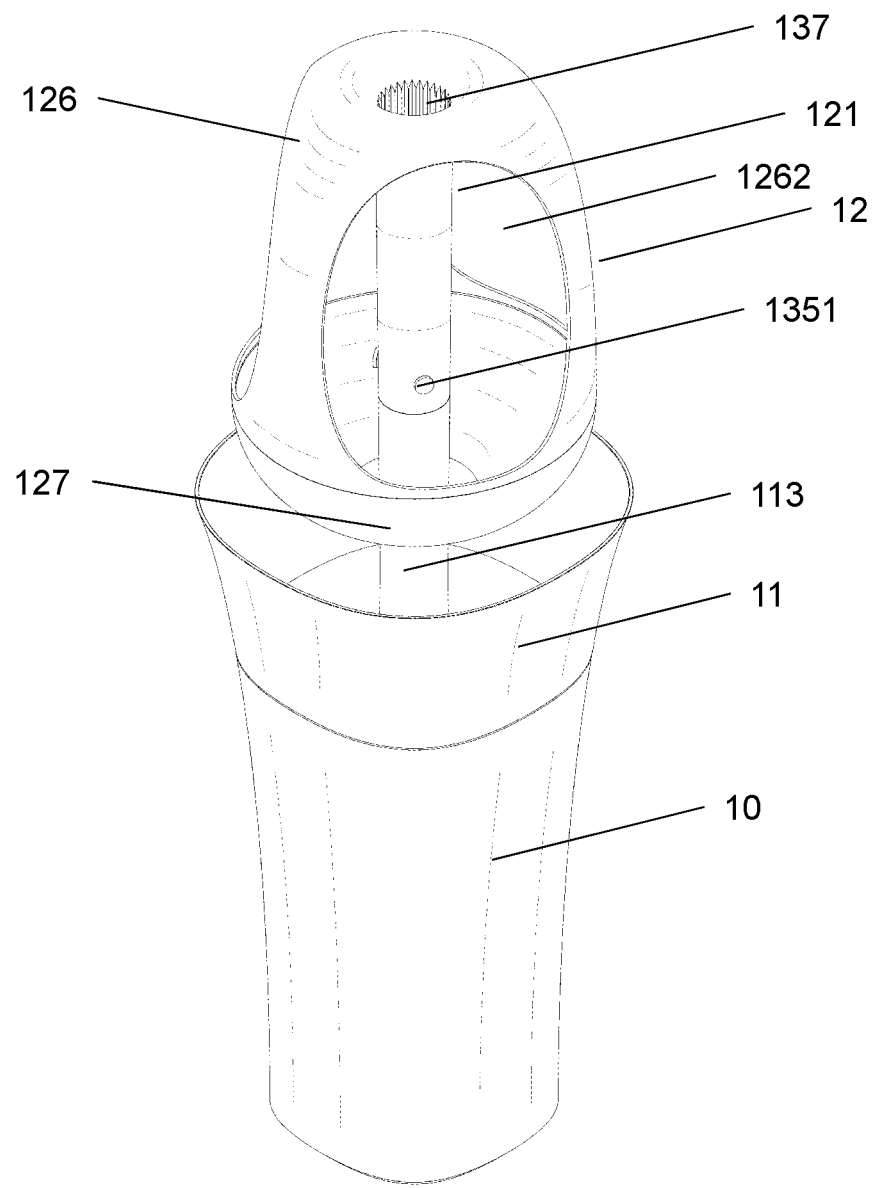
FIG. 1 shows a perspective view of a preferred embodiment of the present invention.
Figure 2:
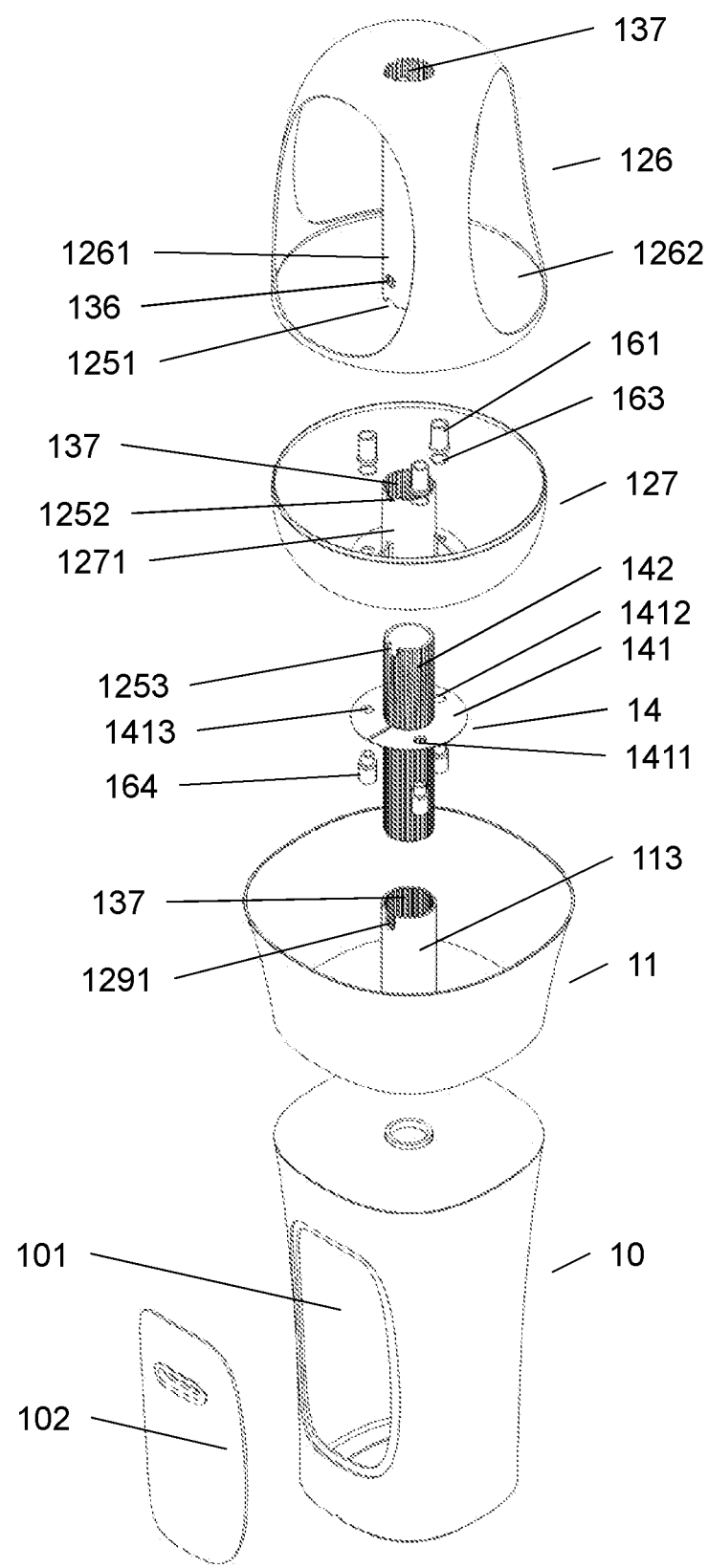
FIG. 2 shows an exploded view of the embodiment as shown in FIG. 1.
Figure 3:
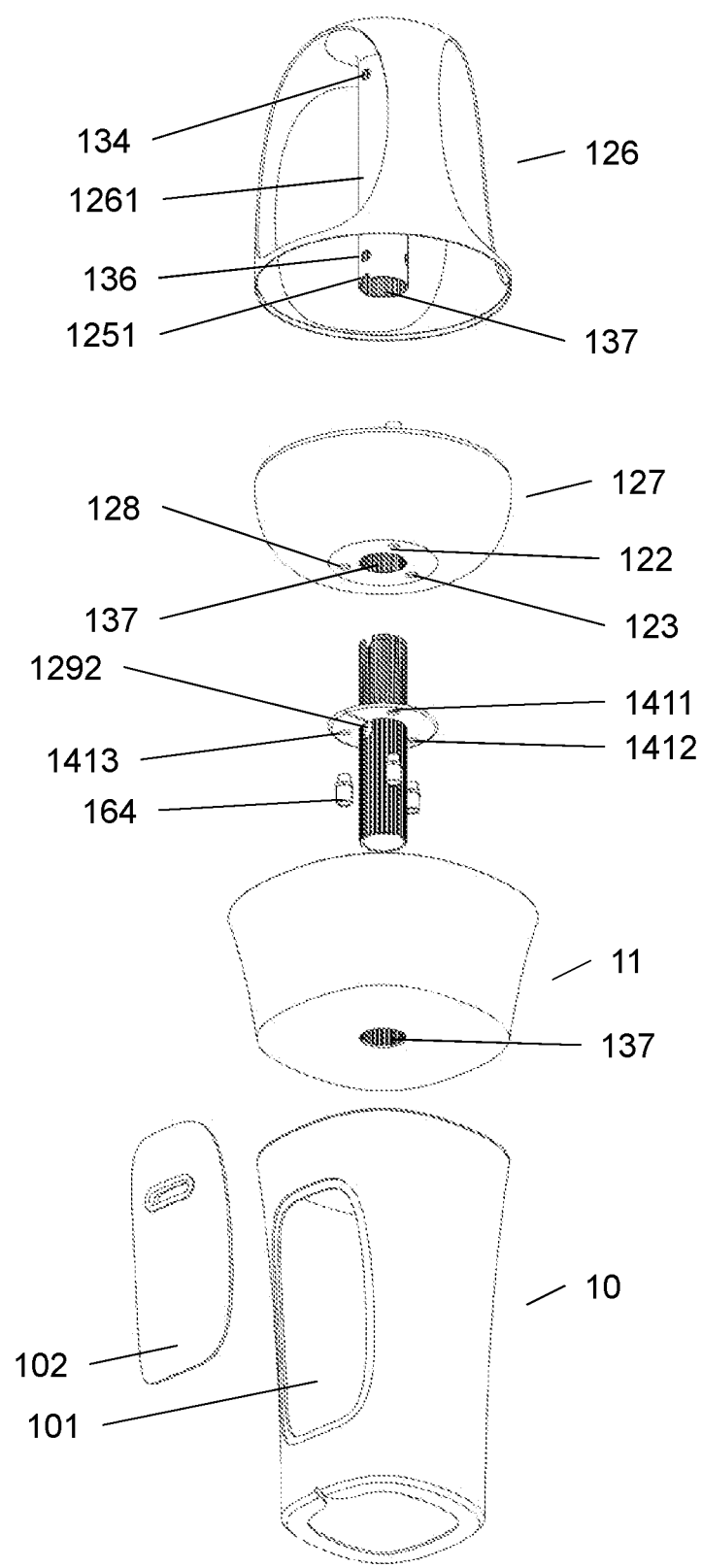
FIG. 3 shows another exploded view of the embodiment as shown in FIG. 1.
Figure 4:
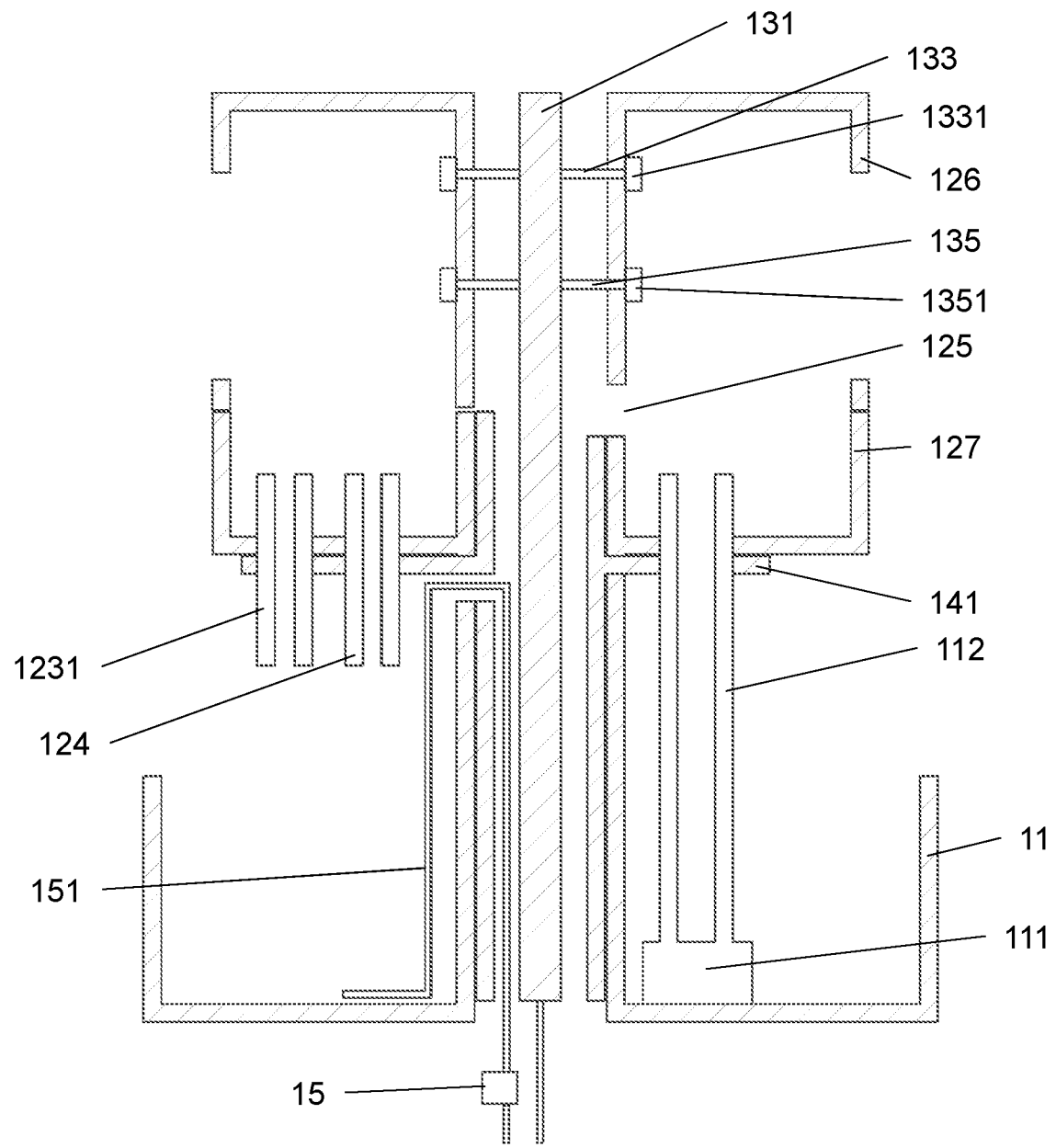
FIG. 4 shows a cross sectional view illustrating the positions of the pump and the pump outlet tube.
Figure 5:
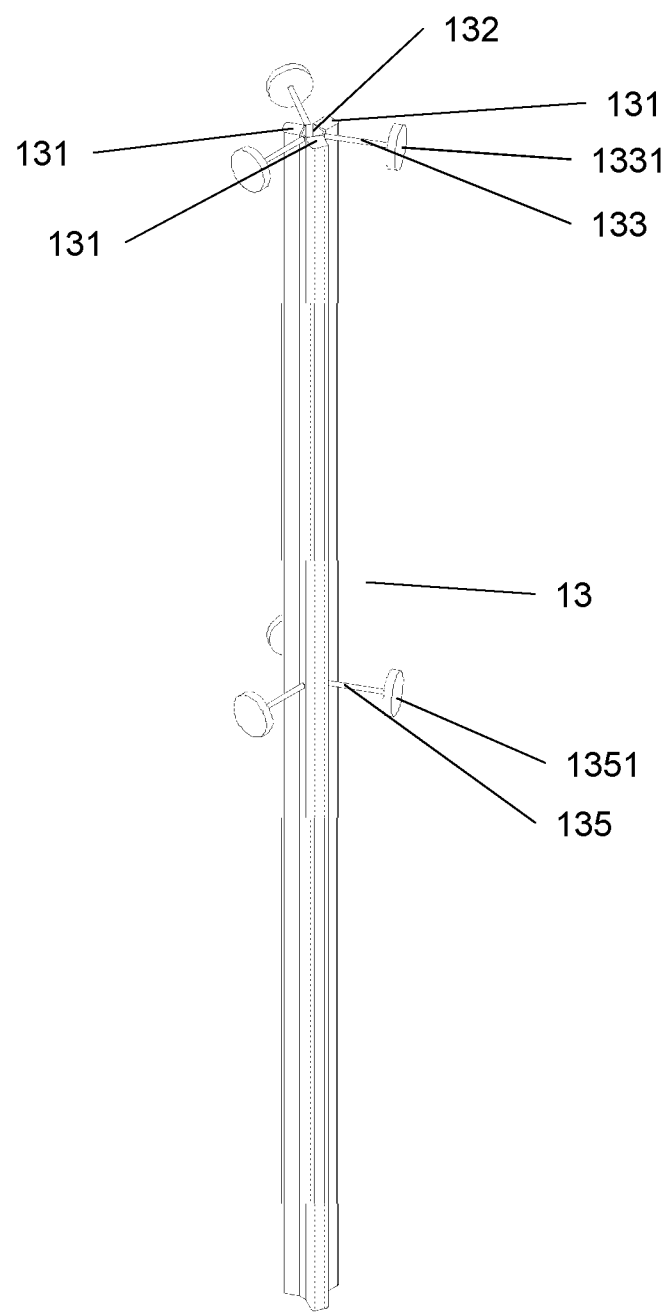
FIG. 5 shows a perspective view of the light source of the embodiment as shown in FIG. 1.
Figure 6:
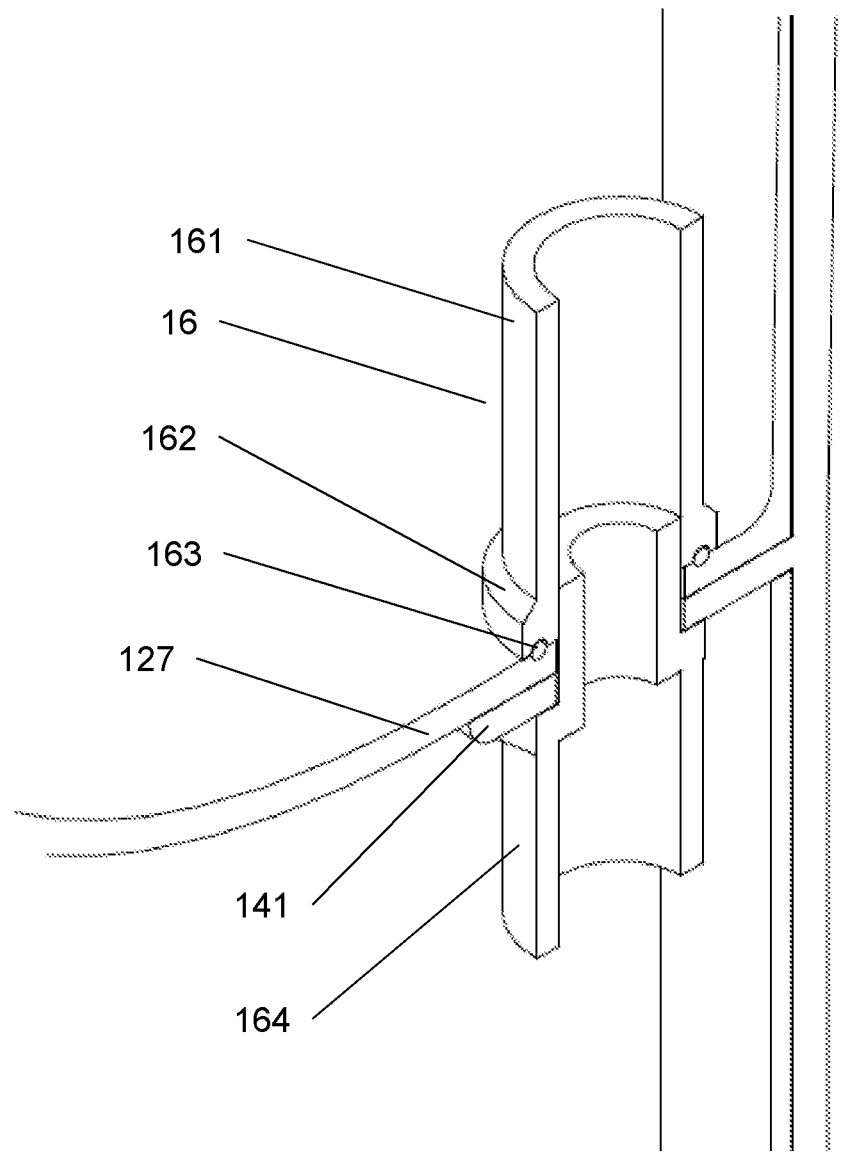
FIG. 6 shows a sectional perspective view of the adapter of the embodiment as shown in FIG. 1.
Figure 7:
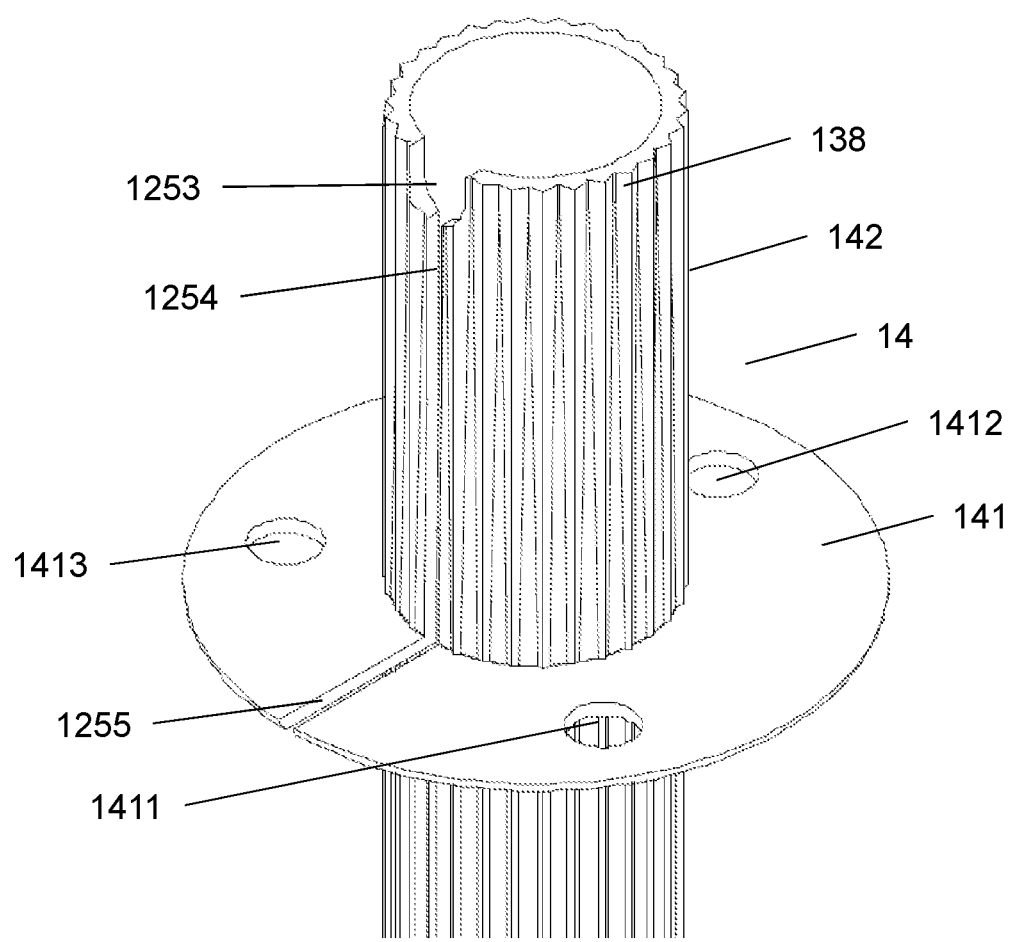
FIG. 7 shows a partial perspective view of the support of the embodiment as shown in FIG. 1.

As illustrated in FIGS. 1 to 7, a preferred embodiment of the indoor aquaponics assembly of the present embodiment comprises a base 10, an aquarium 11, a planter 12, an aquarium conduit 113, a planter conduit 121, a support 14 and a light source 13.

The base 10 has a hollow interior which forms a storage space for users to store various object. For example, a power supply socket which is electrically connected to an external power source may be provided in the hollow interior of the base 10. Other hardware such as third party filtering system could also be accommodated in the base 10. The base 10 is provided with an access opening 101 and a door 102 for removably covering the access opening 101. The door 102 is magnetically connected to the base 10.

The aquarium 11 is an open top container which houses aquatic organisms (such as fish, not shown in the drawings), water (not shown in the drawings), a pump 111 and a pump outlet tube 112 connected to the pump 111 for pumping water together with precipitates (e.g. wastes excreted from the aquatic organisms) in the water from the aquarium 11. The aquarium 11 is positioned above and supported by the base 10.

The planter 12 is positioned above the aquarium 11 and is adapted for housing plants as well as soil, pebbles and the like for growing the plants.

The support 14 is positioned between the aquarium 11 and the planter 12 for connecting the planter 12 to the aquarium 11. The support 14 comprises an annular supporting plate 141 and a connecting conduit 142 passing through the annular supporting plate 141. The annular supporting plate 141 is fixed in position in relation to the connecting conduit 142.

The aquarium conduit 113 extends upwards from a middle portion of a bottom surface of the aquarium 11. The aquarium conduit 113 has an open top end and an open bottom end. The open bottom end of the aquarium conduit 113 communicates with the hollow interior of the base 10. A first portion of the connecting conduit 142 below the annular supporting plate 141 is inserted into the aquarium conduit 13.

The planter 12 sits on top of the annular supporting plate 141. The planter conduit 121 extends upwards from a middle portion of the bottom surface of the planter 12 to a top of the planter 12. The planter conduit 121 has an open top end that opens to an exterior, and an open bottom end. A second portion of the connecting conduit 142 above the annular supporting plate 141 is inserted into the planter conduit 121. The planter conduit 121, the connecting conduit 142 and the aquarium conduit 113 forms an integrated conduit with an integrated interior space which communicates with the hollow interior of the base 10.

The planter 12 is further provided at the bottom surface thereof with a first through hole 122 and a second through hole 123. The annular supporting plate 141 is also provided with a first support through hole 1411 corresponding to the first through hole 122 and a second support through hole 1412 corresponding to the second through hole 123. The first through hole 122 and the first support through hole 1411 are adapted for the pump outlet tube 112 of the pump 111 to pass through for pumping water from the aquarium 11 to the planter 12. The second through hole 123 and the second support through hole 1412 are adapted for a water drainage tube 124 to pass through for draining water from the planter 12 to the aquarium 11. The more the portion of the water drainage tube 124 is exposed in the planter 12, the less the amount of water is drained from the planter 12 to the aquarium 11. The planter conduit 121 is further provided with an opening 125 on a peripheral wall thereof for the electrical wirings of other electrical devices (e.g. sensor) disposed in the planter 12 to pass through so that the electrical wirings are electrically connected with the power supply socket in the base 10.

In this embodiment, the planter 12 comprises an upper shield 126 and a lower base 127 engaged with each other. The lower base 127 is an open top container. The top peripheral edge of the lower base 127 engages with a bottom peripheral edge of the upper shield 126. The upper shield 126 has an upper planter conduit 1261 extended downwards from a top of the upper shield 126. The lower base 127 has a lower planter conduit 1271 extended upwards from a middle portion of a bottom surface of the lower base 127. The upper planter conduit 1261 and the lower planter conduit 1271 are engaged with each other to form the planter conduit 121. The opening 125 provided on the peripheral wall of the planter conduit 121 is formed by a first notch 1251 provided on a bottom edge of a peripheral wall of the upper planter conduit 1261, a second notch 1252 provided on an upper edge of a peripheral wall of the lower planter conduit 1271, and a third notch 1253 provided on an upper edge of a peripheral wall of the connecting conduit 142, all of which are corresponding in position in relation to each other. The second portion of the connecting conduit 142 extends into the lower planter conduit 1271 but not into the upper planter conduit 1261. The upper shield 126 of the planter 12 is provided with a plurality of upper shield openings 1262 on a peripheral wall thereof, so that plants inside the planter 12 may extend outwards from the upper shield openings 1262.

The light source 13 is fixedly disposed within the integrated interior space, and is electrically connected with the power supply socket in the base 10. The light source 13 extends along the integrated interior space to provide lighting for both the planter 12 and the aquarium 11. In this embodiment, the light source 13 is in form of three light tubes 131 fixedly mounted on a support stand 132. Each of the light tubes 131 extends from top to bottom of the integrated conduit. The support stand 132 is in shape of a triangular cylinder with three sides and three edges; the three light tubes 131 are fixedly mounted on the three sides respectively; each of the three edges has an upper bolt 133 extended from the edge through a corresponding bolt opening 134 on an upper portion of a peripheral wall of the upper planter conduit 1261, with a bolt head 1331 of the upper bolt 133 larger in size than the corresponding bolt opening 134 and abutting against the corresponding bolt opening 134 outside the upper planter conduit 1261 to lock the upper bolt 133 in place, and a lower bolt 135 extended from the edge through a corresponding bolt opening 136 on a lower portion of the peripheral wall of the upper planter conduit 1261, with a bolt head 1351 of the lower bolt 135 larger in size than the corresponding bolt opening and 136 and abutting against the corresponding bolt opening 136 outside the upper planter conduit 1261 to lock the lower bolt 135 in place. The upper planter conduit 1261, the lower planter conduit 1271 and the aquarium conduit 113 are each provided with a plurality of grooves 137 on an inner surface thereof for diffusing light from the light source 13. The connecting conduit 142 is also provided with a plurality of grooves 138 on an outer surface of a peripheral wall thereof that aims at both diffusing light from the light source 13 and snugging the parts perfectly. The light source 13 is controlled by a wireless control module operable by a mobile application of an external mobile device, so that users may use the mobile application to control and automate the color, brightness and the timing of the light source 13. In other embodiments, the light source 13 could also be manually controlled.

The bottom surface of the planter 12 may further be provided with a third hole 128 for a backup drainage tube 1231 (or a backup pump, a backup drainage tube, a water sensor such as water temperature, pH or ORP (Oxidation Reduction Potential) or other sensors). The annular supporting plate 141 is provided with a third support through hole 1413 corresponding to the third hole 128. In this embodiment, an air pump 15 is disposed inside the base 10. The air pump 15 has an air tube 151. The aquarium conduit 113 is provided with an aquarium conduit opening 1291 on an upper edge of a peripheral wall thereof, and the connecting conduit 142 is provided with a second opening 1292 corresponding to the aquarium conduit opening 1291; the air tube 151 passes through the aquarium conduit opening 1291 and the second opening 1292 into the aquarium 11.

To facilitate installation of the water pump 111, the air pump 15 and so forth, an elongated slot 1254 is provided on the peripheral wall of the connecting conduit 142 to connect the third notch 1253 and the second opening 1292, and a slot 1255 is provided on the annular supporting plate 141 corresponding to the elongated slot 1254, so that wirings of the pumps could pass through the connecting conduit 142 to the base 10 during installation.

Furthermore, an adapter 16 is provided at each pair of the first through hole 122 and the first support through hole 1411, the second through hole 123 and the second support through hole 1412, and the third support through hole 1413 and the third hole 128. Each of the adapters 16 comprises an upper tube 161 with a flange 162 at its base, a sealing ring 163, and a lower tube 164. The lower tube 164 has an upper part which passes through the annular supporting plate 141 and threadedly connects with the upper tube 161. The sealing ring 163 is positioned between the flange 162 and the lower base 127 to ensure waterproofness.

In operation, the pump 111 draws water together with precipitates (e.g. wastes excreted from the aquatic organisms) in the aquarium 11 to the planter 12 for nurturing the plants in the planter 12. The plants in the planter 12 absorb the nutrients of the fish waste; the roots of the plants would break the ammonia of the fish waste into nitrates and nitrites, and the water is then drained back to the aquarium 11 via the water drainage tube 124 for the fish to eat the nitrites.

The above embodiment is a preferred embodiment of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:
1. An indoor aquaponics assembly, comprising:
    a base having a hollow interior,
    an aquarium being an open top container, wherein the aquarium is positioned above and supported by the base;
    a planter positioned above the aquarium;
    an aquarium conduit extended upwards from a bottom surface of the aquarium, wherein the aquarium conduit has an open top end and an open bottom end which communicates with the hollow interior of the base;
    a planter conduit extended upwards from a bottom surface of the planter, wherein the planter conduit has an open bottom end which engages and communicates with the open top end of the aquarium conduit so that the planter conduit and the aquarium conduit form an integrated conduit with an integrated interior space which communicates with the hollow interior of the base;
    the planter is further provided with at least two through holes facing towards the aquarium, one being adapted for a water drainage tube to pass through for draining water from the planter to the aquarium, and one being adapted for a tube of a pump to pass through for pumping water from the aquarium to the planter;
    the planter conduit is further provided with an opening on a peripheral wall thereof;
    a support is positioned between the aquarium and the planter for connecting the planter to the aquarium: the support comprises an annular supporting plate and a connecting conduit passing through the annular supporting plate: the annular supporting plate is fixed in position in relation to the connecting conduit: the planter sits on top of the annular supporting plate; a first portion of the connecting conduit below the annular supporting plate is inserted into the aquarium conduit; a second portion of the connecting conduit above the annular supporting plate is inserted into the planter conduit: the open bottom end of the planter conduit engages and communicates with the open top end of the aquarium conduit via the connecting conduit so that the planter conduit, the connecting conduit and the aquarium conduit form the integrated conduit with the integrated interior space which communicates with the hollow interior of the base; the annular supporting plate is provided with a first support through hole corresponding to the first through hole adapted for the pump outlet tube of the pump to pass through for pumping water from the aquarium to the planter, and a second support through hole corresponding to the second through hole adapted for the water drainage tube to pass through for draining water from the planter to the aquarium.

2. The indoor aquaponics assembly as in claim 1, wherein the aquarium conduit extends upwards from a middle portion of the bottom surface of the aquarium.

3. The indoor aquaponics assembly as in claim 1, wherein the planter conduit extends upwards from a middle portion of the bottom surface of the planter to a top of the planter, and the planter conduit has an open top end that opens to an exterior.

4. The indoor aquaponics assembly as in claim 1, wherein the at least two through holes are provided at the bottom surface of the planter.

5. The indoor aquaponics assembly as in claim 1, wherein a light source is fixedly accommodated within the integrated interior space to provide lighting for both the planter and the aquarium all around 360 degrees.

6. The indoor aquaponics assembly as in claim 5, wherein the light source is in form of three light tubes fixedly mounted on a support stand; each of the light tubes extends from top to bottom of the integrated conduit; the support stand is in shape of a triangular cylinder with three sides and three edges; the three light tubes are fixedly mounted on the three sides respectively; each of the three edges has an upper bolt and a lower bolt, each of which extends from the edge through a corresponding bolt opening on the planter conduit and having a bolt head larger in size than the corresponding bolt opening and abutting against the corresponding bolt opening.

7. The indoor aquaponics assembly as in claim 5, wherein the planter conduit and the aquarium conduit are each provided with a plurality of grooves on an inner surface thereof for diffusing light from the light source.

8. The indoor aquaponics assembly as in claim 5, wherein the light source is either controlled manually or by a wireless control module operable by a mobile application of an external mobile device.

9. The indoor aquaponics assembly as in claim 1, wherein the connecting conduit is provided with a plurality of grooves on an outer surface of a peripheral wall thereof for diffusing light from the light source.

10. The indoor aquaponics assembly as in claim 1, wherein
the planter comprises an upper shield and a lower base engaged with each other;
the upper shield has an upper planter conduit extended downwards from a top of the upper shield;
the lower base has a lower planter conduit extended upwards from a middle portion of a bottom surface of the lower base;
the upper planter conduit and the lower planter conduit are engaged with each other to form the planter conduit.

11. The indoor aquaponics assembly as in claim 10, wherein the upper shield of the planter is provided with a plurality of upper shield openings on a peripheral wall thereof.

12. The indoor aquaponics assembly as in claim 1, wherein
the planter comprises an upper shield and a lower base engaged with each other;
the upper shield has an upper planter conduit extended downwards from a top of the upper shield;
the lower base has a lower planter conduit extended upwards from a middle portion of a bottom surface of the lower base;
the upper planter conduit and the lower planter conduit are engaged with each other to form the planter conduit;
the opening provided on the peripheral wall of the planter conduit is formed by a first notch provided on a bottom edge of a peripheral wall of the upper planter conduit, a second notch provided on an upper edge of a peripheral wall of the lower planter conduit, and a third notch provided on an upper edge of a peripheral wall of the connecting conduit, all of which are corresponding in position in relation to each other.

13. The indoor aquaponics assembly as in claim 12, wherein the upper shield of the planter is provided with a plurality of upper shield openings on a peripheral wall thereof.

14. The indoor aquaponics assembly as in claim 12, wherein the aquarium conduit is provided with an aquarium conduit opening on an upper edge of a peripheral wall thereof, and the connecting conduit is provided with a second opening corresponding to the aquarium conduit opening; an elongated slot is provided on the peripheral wall of the connecting conduit to connect the third notch and the second opening, and a slot is provided on the annular supporting plate corresponding to the elongated slot.

15. The indoor aquaponics assembly as in claim 1, wherein a power supply socket which is electrically connected to an external power source is provided in the base.

16. The indoor aquaponics assembly as in claim 1, wherein the aquarium conduit is provided with an aquarium conduit opening on an upper edge of a peripheral wall thereof, and the connecting conduit is provided with a second opening corresponding to the aquarium conduit opening.

* * * * *